(12) United States Patent
Latypov et al.

(10) Patent No.: US 10,595,147 B2
(45) Date of Patent: Mar. 17, 2020

(54) METHOD OF PROVIDING TO USER 3D SOUND IN VIRTUAL ENVIRONMENT

(71) Applicants: Ray Latypov, Binghamton, NY (US); Alfred Latypov, Binghamton, NY (US); Nurali Latypov, Moscow (RU)

(72) Inventors: Ray Latypov, Binghamton, NY (US); Alfred Latypov, Binghamton, NY (US); Nurali Latypov, Moscow (RU)

( * ) Notice: Subject to any disclaimer, the term of this patent is extended or adjusted under 35 U.S.C. 154(b) by 7 days.

(21) Appl. No.: 16/350,392

(22) Filed: Dec. 28, 2015

(65) Prior Publication Data

US 2019/0335288 A1    Oct. 31, 2019

Related U.S. Application Data

(60) Provisional application No. 62/096,533, filed on Dec. 23, 2014.

(51) Int. Cl.
*H04S 7/00*    (2006.01)
*G06F 3/16*    (2006.01)
*H04S 3/00*    (2006.01)

(52) U.S. Cl.
CPC .............. *H04S 7/303* (2013.01); *G06F 3/165* (2013.01); *H04S 3/008* (2013.01);
(Continued)

(58) Field of Classification Search
CPC .......... H04R 2225/025; H04R 2420/01; H04R 2420/07; H04R 2430/01; H04R 5/033; H04R 1/1016; H04S 2400/01; H04S 2400/11; H04S 2400/13; H04S 7/303; H04S 7/304; G06F 3/165
(Continued)

(56) References Cited

U.S. PATENT DOCUMENTS 8,718,930 B2 *   5/2014  Tachibana .............. G01C 21/00
                                                                  701/428
8,804,461 B2     8/2014  Imran
(Continued)

OTHER PUBLICATIONS

International Search Report and Written Opinion for PCT/IB2017/053803, dated Feb. 14, 2018.
(Continued)

*Primary Examiner* — William A Jerez Lora
(74) *Attorney, Agent, or Firm* — Marshall, Gerstein & Borun LLP

(57) ABSTRACT

The invention provides the following items: A method of interactive providing a music composition to user; A method of using 3D sound for orientation of a user on the remote target; A method of providing a computer game to play blindfold; The method of providing to a user the interactive applications with unlimited locomotion. The inventions are based on ability of human binaural hearing and possibility to provide 3D sound to headphones to user from objects in virtual space. User is immersing into virtual space represented by sound objects. Using the user position and orientation in virtual space and position of every sound objects in virtual space, it is possible calculate and provide to a left and a right user's ears 3D sound using Head-Related Transfer Function. With such 3D sound user is able to localize the sound source position and interact with the sound object even blindfold.

10 Claims, 7 Drawing Sheets

(52) U.S. Cl.
CPC ....... *H04S 2400/01* (2013.01); *H04S 2400/11* (2013.01); *H04S 2400/13* (2013.01); *H04S 2420/01* (2013.01)

(58) Field of Classification Search
USPC ............ 381/56, 58, 303, 310, 311, 312, 313
See application file for complete search history.

(56) References Cited

U.S. PATENT DOCUMENTS

| | | | |
|---|---|---|---|
| 9,584,912 B2 | 2/2017 | Koppens et al. | |
| 9,693,137 B1* | 6/2017 | Qureshi | G11B 27/031 |
| 2003/0115068 A1* | 6/2003 | Boesen | G10L 15/005 |
| | | | 704/277 |
| 2006/0147068 A1* | 7/2006 | Aarts | A61B 5/02438 |
| | | | 381/309 |
| 2009/0010456 A1* | 1/2009 | Goldstein | H04R 25/02 |
| | | | 381/110 |
| 2011/0299707 A1* | 12/2011 | Meyer | H04S 7/304 |
| | | | 381/310 |
| 2013/0083173 A1* | 4/2013 | Geisner | G06F 3/013 |
| | | | 348/51 |
| 2014/0058662 A1* | 2/2014 | Tachibana | G01C 21/00 |
| | | | 701/428 |
| 2016/0324478 A1* | 11/2016 | Goldstein | A61B 5/721 |
| 2017/0038943 A1 | 2/2017 | Seligmann et al. | |
| 2017/0041730 A1 | 2/2017 | Seligmann et al. | |

OTHER PUBLICATIONS

International Preliminary Report on Patentability for PCT/IB2017/053803, dated Jan. 9, 2020.

* cited by examiner

METHOD OF PROVIDING TO USER 3D SOUND IN VIRTUAL ENVIRONMENT 3D sound is a dimensional sound correctly calculated that comes to stereo headphones and allows the user to localize a sound source in the virtual space so to define location of the sound source intuitively.

The possibility of application creation based only on sound, on dimensional sound that allows positioning of its source or sources so enabling blindfold control of the application or control by a blind person.

Binaural hearing features special possibilities which are not used completely in the modern applications such as computer games, recording and listening to music.

It has minimal effect even if some games support 3D sound partially because generally all computers and game consoles are placed stationary as well as stereo and Dolby Surround systems and nothing depends on the user rotations towards the sound sources. Stereo headphones also have no appropriate effect as the sound does not change by head rotations. The key to 3D sound is in usage of orientation sensors on the user's head. In addition the user's head orientation is known and this information is used for correct audio reproduction from the positional sound source in the virtual space for two ears of the user.

According to the invention, for calculation of the sound level from the source located at the definite place of the virtual space model a sound engine has to use sound source directivity when it makes sense, coordinates and user's head orientation in the space, head orientation and position so as the level values depend on the distance of the source to each ear, time delay of the sound arrival to each ear, taking into account the ear «shading» with head if the ear is not on the line of sight of the sound source (head-related transfer function), sound diffraction, and taking into account the sound spectral component. Sound of different frequency is shaded with head in a different way and perceived differently because of the curvature of the external ear.

It is useful to apply means to determinate the user orientation (user's head) in the space and its appropriate orientation in the virtual space; this raises the possibility to transfer sound to ears from the source in the virtual space and it allows the user to determine localization of the sound source. It should be noted that according to the invention applications that use three-dimensional sound can be whether assisted by 3D image or be without visualization and be perceived only aurally.

A method for providing the user with binaural sound using modification of original sound for two ears of the user with the use of calculations for transmission of correct graded volume to each ear, with calculated time delay of the sound front, using pitch level filter to ensure natural sound perception and its source localization in the virtual space.

A method for creation of applications with three-dimensional virtual space enabling the user to determine its localization of sound sources in the virtual space naturally. For this purpose all possible properties of hearing are used, its physiology and features of sound propagation in the space and user's head. Applications created according to the invention allow the user of the application to determine localization of the sound source aurally, naturally the way man does it since his birth and following his experience.

The distance from the sound source depends on the position and orientation of the user's head towards the sound source. For example, the closer sound source to the ear is, the louder is the sound. The bigger distances difference from the sound source to the different ears is, the bigger is the time delay of arrival of the sound wave front to the farther ear. Except the difference in sound level because of difference in distance to the sound source the sound volume highly decreases for a sound "shaded" by head that should be used by correct determination of the necessary sound level for different ears. In such case the shading goes on in different way depending on the sound frequency.

The method enables to create a pure sound games without image at all or for a period of time. It is possible to play aurally. One can listen a sound of the object, determine its localization and, e.g. to come closer to it or move away from it or shoot in it depending on the aims of the application.

Image of a head and the difference of distances to ears. Average distance between the human ears is 6 inches.

Binaural hearing—two components, time delay is not implemented in DirectSound, Open GL libraries and others, and surround effect is partially implemented in some sound engines and libraries which usage is impossible without connection to orientation 3D sensors as either stereo speakers or even surround system can not provide precise positioning of the sound source for all directions.

One of the possibilities to use modern smart phones and tablets with rotation sensors. If we connect stereo headphones to them and transmit the correctly calculated sound according to the invention it is possible to use rotation sensor of a smartphone instead of a sensor on head because if the user holds it in hand he usually looks perpendicularly at display, this means his head and the smartphone rotate synchronously. If the smartphone is worn on head they are connected according to this invention.

A method for creation and functioning of a computer application in which 3D sound is a leading part. For successful run of the application the user should consistently position his source in the simulated 3D space, the space itself can be displayed or not.

Space diversity of two hearing receivers (external ears) and screening effect of the head and body with the use of diffraction effects lead to significant difference between signals transferred to the right and left ears; it enables localization of the sound source in the space that is conditioned by three physical factors:

a) time (Interaural Time Difference—ITD)—resulting from time difference of arrival of the same sound phases to the left and right ears;

b) intensity (Interaural Intensity Difference—IID)—resulting from different intensity values of the sound wave because of its diffraction around the head and formation of «acoustic shadow» from the side opposite to the sound source-head-related transfer function.

c) spectrum—resulting from difference in the sound spectrum receipted by the left and right ears because of different screening effect of the head and external ears on the low-and high-frequency components of the complex sound.

A sound can be represented by numerous sources: by voice, music, speaking, by a song, animals, natural phenomena etc. A sound has numerous properties: pitch level (frequency), volume, directional properties, speed of propagation, attenuation. A real sound wave is not plane but spherical. Intensity of the spherical wave decreases in inverse proportion to the squared distance. By calculation of volume value for the user's ear it is necessary to account that by infinitely near approaching the sound will be maximal. This maximum is to be limited to the safe threshold to prevent hurting the user's hearing. If, e.g. the sound source in a game is an explosion, it will not increase the threshold with the raised volume at a distance by quadratic attenuation. But if the explosion in the virtual space is near the user's ear, it is necessary to transmit not a nominal calculated value when it exceeds the threshold but a threshold one. This logic can and should be set into sound engines for applications to ensure safety for hearing and health of the user.

Sound perception depends on microphone sensitivity, hearing that can have minimal and maximal thresholds of perception, specialty of sound sensitivity depending on frequency. Most of the animals including a human being have binaural hearing, they have two ears (sound detectors) mutually spaced and generally oriented in a different way. A lot of animals are able to change their ears and external ears orientation in the right direction. It means that depending on how soon a wave front arrives to the detector (an ear, a microphone) and how loud is the sound the user can determine its location (distance and direction) intuitively. The user (listener) perceives the spatial location of the sound source automatically, subconsciously and by experience. On the one hand it is an objective process laid down by the animal physiology instinctively. On the other hand it heavily depends on individual peculiarities of perception, shape of external ears, sensitivity and background experience. For example, a man who has already heard the buzzing of a bumblebee and identified its spatial location will be able to imagine pretty exactly where it is towards him (in the space) on hearing it. If a man does not know a "standard" volume of the sound source it will be difficult for him to determine the distance to it exactly even though he can pretty exactly determine the direction from where the sound comes. In 3D sound application we need firstly to give sound examples with their standard volume and show who produces them, how much do they cost and the way the price changes depending on time. The arrival of the sound reflections in the space to ears has also its effect on the perception process. Sometimes in corridors of a building, in the city with buildings, in a forest the user hears louder sounds of the reflected sound signal especially when the source is closed from the line of sight with some obstacle. The user can come to a conclusion about the real source position intuitively or logically. It can be critical for training of military and policemen. Reflection, diffraction and interference can be also programmed for sound engines of computer applications, for plausible sounds reproduction in the virtual space.

Each sound source has its 6-DOF coordinates. 6-DOF is 6 measurements, 3 of which are line coordinates (e.g., orthogonal coordinates X, Y, Z) and three coordinates which locate orientation (e.g., Eulerian angles). The same orientation can be represented in a different way, e.g. uniquely described with four quaternions. Each user has his 6-DOF coordinates in the space. Both coordinates of the user and sound sources in the virtual space can be described with 6-DOF coordinates or in a different way, and their coordinates can vary with time. Modern technologies allow tracking the movements of hands and fingers in real time and in such a way to control objects in the virtual or augmented reality. For manipulated object it is profitable to bring to correspondence the three-dimensional sound and change it depending on position, orientation and manipulation by hands. For example, clenching hands to whistle with an inflatable toy, to hear a purr of a virtual cat which is stroked.

BRIEF DESCRIPTION OF THE DRAWINGS

The above and other exemplary aspects and advantages of the present invention will become more apparent by the following detailed description of exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
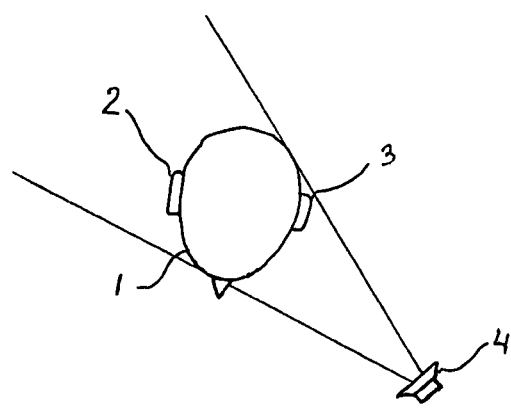
FIG. 1 is a view illustrating shadowed right ear of the user from sound source.

FIG. 1 is a view from above to a user 1 with a right ear 2 and a left ear 3 and a sound source 4. A sound can freely come to the left ear of the user. But the right ear in this position and orientation is shadowed by user's head. The sound volume for the right ear will be much lower than in the left ear or absent. Even lower sound signal will be different the for the left ear not just by volume level, but by frequency characteristic. Lower frequency signal could reach the shadowed ear by diffraction, but high frequency not. Also wave front of the sound signal will come to the left ear earlier than to right ear.

Figure 2:
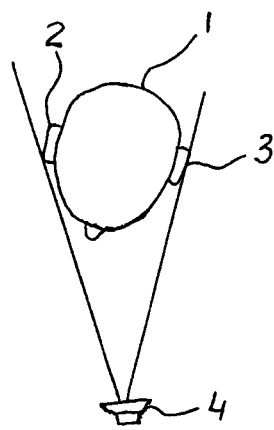
FIG. 2 is a view illustrating both ears can hear the sound source but differently.

FIG. 2 shows another disposition of user's head according the sound source than on FIG. 1. Both ears will hear the sound signal but sound volume for the left ear will be higher than for the right ear. Also wave front of the sound signal will come to the left ear earlier than to the right ear.

Figure 3:
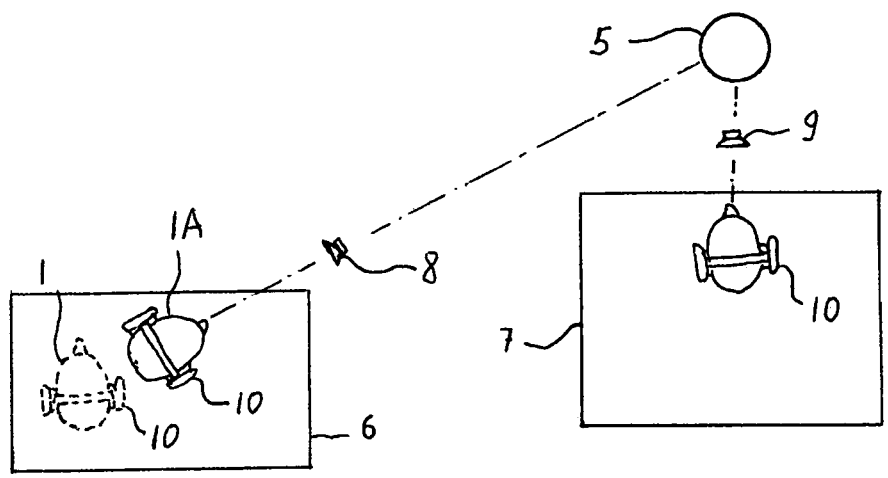
FIG. 3 is a view illustrating users orientation to remote target from two different cities.

FIG. 3 illustrates differ of users orientation to one remote target 5 from different cities 6 and 7. User 1 is initial position of the user in the first city 6. Application creates for the user 1 in the first city 6 a virtual sound beacon 8 using data about user's position and orientation and remote target coordinates. When user hear a signals of 3D sound in the headphones, user will understand that target is on the right, because the right earphone is louder than the left. User 1 proper orientation to the remote target 5 (sound beacon 8) is illustrated by user's position and orientation 1A. It is same user but turned to the target using headphones 10 and signals from sound beacon 8. The user 11 is located in the second city 7, user is oriented to the same remote target 5 by virtual sound beacon 9 that is between the user 11 and target 5.

Figure 4:
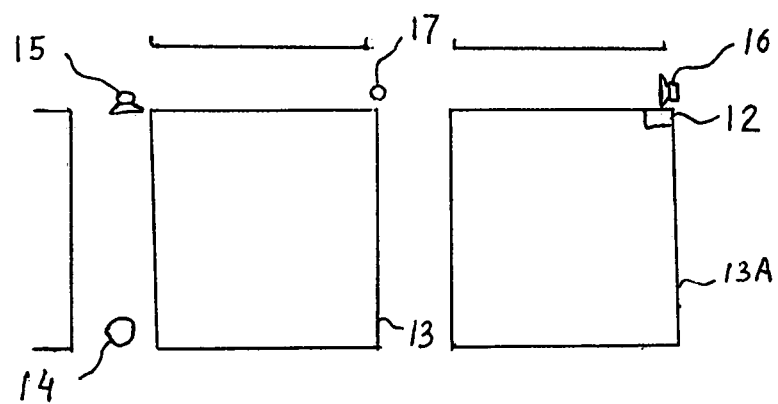
FIG. 4 is a view illustrating sample of navigation in the city via sound beacons.

FIG. 4 is a view illustrating sample of navigation for the user 1 on user's initial position in the city via sound beacons. Position of the user could be determining by GPG sensor. Navigator also should define the user's orientation to create the sound beacon in the right direction in virtual space and provide the proper sound signals to user's ears. The target location is 12. There are illustrated two blocks 13 and 13A of the city. A navigator will create route where user should go first in direction to the sound beacon 15. The command could be "Go 100 yards in direction to the sound". As soon as user will reach the sound beacon 15, local target 15 should be canceled. Then navigator will advise turn right in direction to sound beacon 16, that will begin work, and go 200 yards. On the end of the block 13 in position 17 user could hear warning about street crossing. As soon as user will reach position of sound beacon 16, the user will be informed "You have arrived, your destination is on the right".

Figure 5:
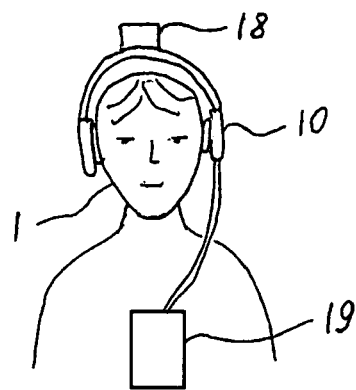
FIG. 5 is a view illustrating headphone with a orientation sensor connected to a gadget.

FIG. 5 is a view illustrating user 1 with headphone 10. The headphone is integrated with a orientation sensor 18 connected to a gadget 19. It is preferable to detect orientation of the user's head for proper calculation 3D sound according the sound source in virtual space and use Head-Related Transformation Function (HRTF). Orientation sensor located on the head is the best option of determining the user's orientation.

Figure 6:
FIG. 6 is a view illustrating headphone integrated with the gadget.

FIG. 6 is a view illustrating headphone 18 integrated with the gadget 21. Such device could consist GPS sensor, orientation sensor, microprocessor for 3D sound calculation and other means. The control of application and gadget can be provided by verbal commands as well.

Figure 7:
FIG. 7 is a view illustrating headphone without orientation sensor, the orientation sensor is in the gadget.

FIG. 7 is a view illustrating a headphone 22 without an orientation sensor, the orientation sensor is in the gadget 23. Preferably if a user will hold the gadget by two hand to be able synchronously turn with the gadget. In this case orientation data from orientation sensor of the gadget could be used as orientation of user. As a rule when user look to a screen of the gadget perpendicular. That means that orientation of the gadget relatively constant to user's orientation when user use the gadget and look to the gadget screen.

Figure 8:
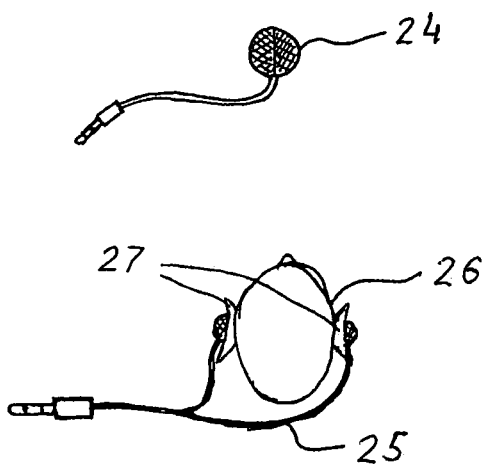
FIG. 8 is a view illustrating samples of stereo microphones: regular and for 3D sound.

FIG. 8 is a view illustrating samples of regular stereo microphone 24 and stereo microphone 25 for 3D sound records. As a rule regular stereo microphones built in one body very close to each other a left and a right sensors. Proper stereo microphone 25 to with purpose to record the 3D sound should be different. There is distance about 6 inches should be between the left and right sensors. The dummy 26 is recommended to place between the sensors. The dummy will create shadow to the sensors when sensor is on the other side of the dummy from sound source. Also recommended to put microphone sensors into ear-type locators 27.

Figure 9:
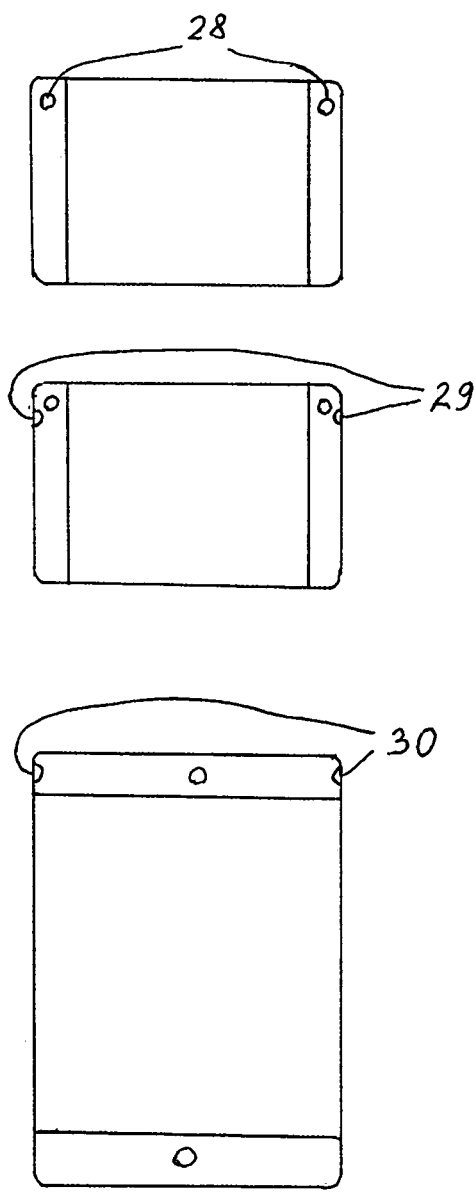
FIG. 9 is a view illustrating samples of integrating stereo microphone into gadgets.

FIG. 9 is a view illustrating samples of integrating stereo microphone into gadgets. There are two smart phones and one tablet on the drawing. Microphones with positions 28 are located in front of the gadget with some distance between each other, for example, close to positions of stereo cameras. Microphones with positions 29 are located on the sideways of the gadget. Such positions of microphones could help create shadow effect and use the gadget as a dummy. Microphones with positions 30 are located on the sideways of the gadget's narrow side, if it is big size tablet.

Figure 10:
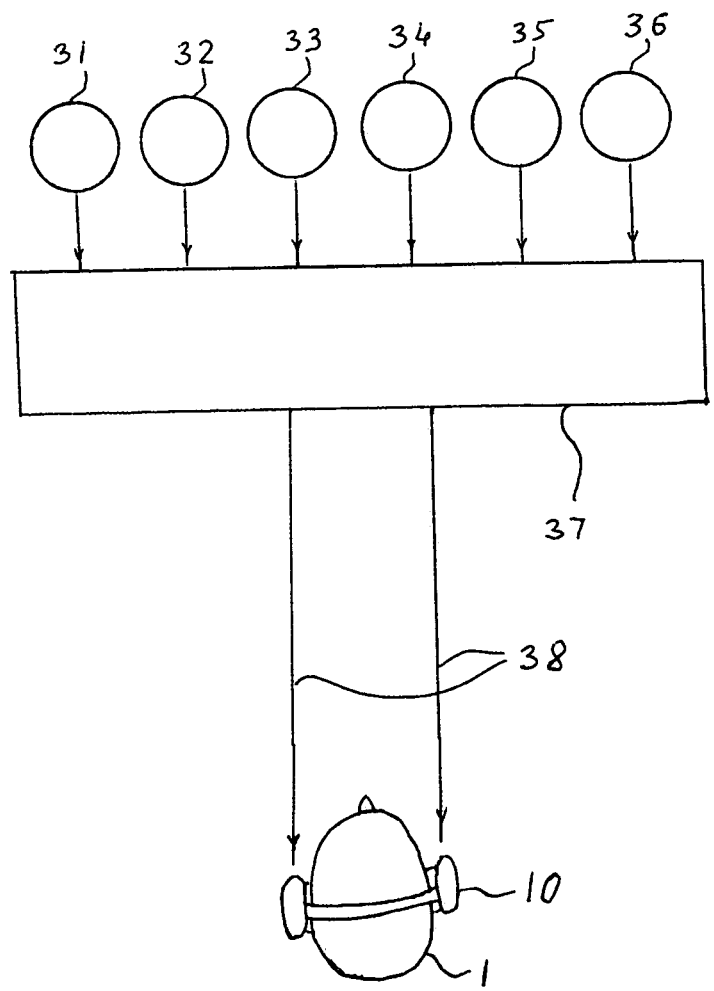
FIG. 10 is a view illustrating traditional method of creating and providing a music composition.

FIG. 10 is a view illustrating traditional method of creating and providing a music composition. There are 6 sound tracks coming, for example, from vocal 31, rhythm guitar 32, bas-guitar 33, keyboard 34, percussion instruments 35 and guitar 36. As a rule all tracks written separately in studio. Than sound director (soundman) in studio 37 edits (bring together) for users (listeners) two channels of stereo records 38. All users hear the music composition as it was edited by soundman in studio independently from medium: vinyl, cassettes, CD or mp3. Always for all users it will be the same music composition. All possible interactivity for the users are balancing between right and left channels and changing the volume. There are no big difference between stereo, quadro or Dolby—all of them is fixed forever records.

Figure 11:
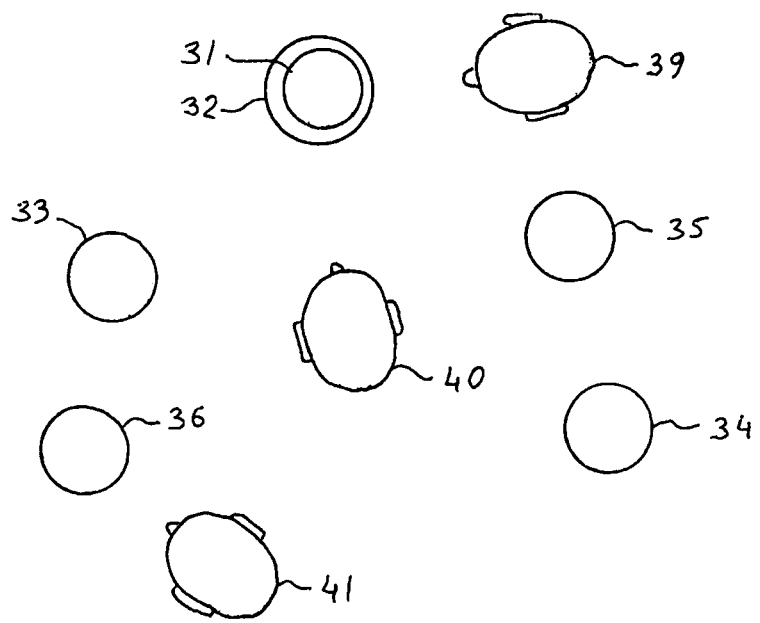
FIG. 11 is a view illustrating three different position and orientation of user in virtual space.

FIG. 11 is a view illustrating three different position and orientation of user-listener in virtual space. The method according the invention proposes solution for interactive listening of a music composition. There is not necessary to bring together several sound tracks to stereo in fixed way. The sound track sources 31-36 placed into virtual space each other with own coordinates. User is immersed into the virtual space. All sound tracks activating and playing inside the virtual space. User 1 will be able move in the virtual space and hear the music composition interactively. Sound engine will calculate and provide sound signal in real time volume for the left and right ears of the user from each sound source. The calculation should take into consideration HRTF and user's position and orientation data, sound sources coordinates data. On the FIG. 11 are illustrated three different user positions and orientations 39, 40 and 41 relative to the positions of soundtracks sources. For example, position and orientation 39 of the user allow to hear with a good volume singer (vocal 31) with the rhythm guitar, same time hear from his left with good volume percussion instruments 35. The user will hear all other instruments with lower volume as a background. Position and orientation 41 of the user allow to hear with a good volume in front of the user the guitar 36. User will be able to hear all details of this guitar, because all other instruments and vocal will be with lower volume as a background. Position 40 of the user is integral. It allow to hear all instruments and vocal with same volume same time. User will hear that he surrounded by all instruments. Maybe user will hear music composition in position 40 very close to he could hear brought together in studio same music composition.

Figure 12:
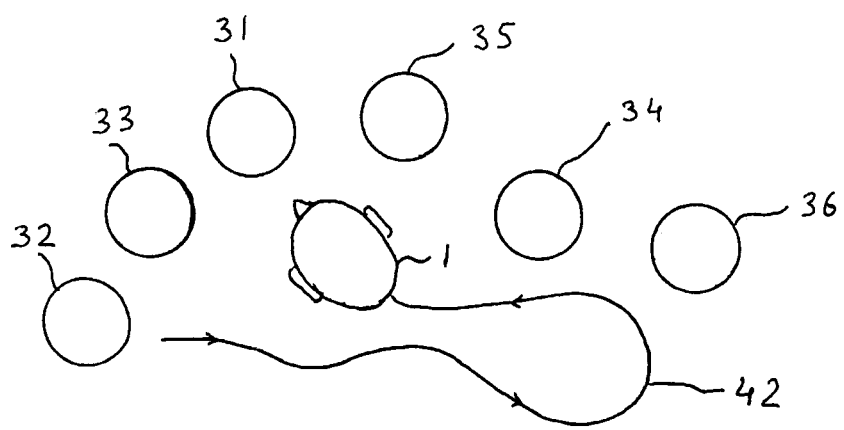
FIG. 12 is a view illustrating another disposition of the band and user's route.

FIG. 12 is a view illustrating another disposition of the band and user's interactive route. There is another disposition of musical instruments and vocal sources on the FIG. 12 than was illustrated on FIG. 11. The route 42 shows how the user changed his position during playing a part of the music composition. User will be able move in virtual space between the music instruments and vocal every next hearing time differently. Every time user will be able to hears and percepts new aspects and details of music composition. Such interactive possibilities were not possible with fixed brought together and fixed music composition. User hears the fixed music equally always. Same time in virtual space user will be able could move by different routes to take into consideration different aspects of music composition.

An application on the smartphone with three-dimensional sound can be used for positioning of GPS. For example, the user stands in the center of a stadium indicating this place as a zero, another user can be at the stadium at the same time in another spot of the world. Applications on the gadgets can be connected in one network via Internet and exchange mutual relative data where original coordinates were converged. If the task of one user is to catch another one in the same virtual space they can even not be displayed to each other visually, and an acoustic beacon is given in their location. Another user will hear where and which side the user is and he can go in this direction. And the first one will attempt to go away from him. For example to catch means to come to the partner at the certain distance in the virtual space. It is almost the same as run one after another in the darkness in one real space with orientation by sound. Taking into account that the user's eyes can not get distracted from the screens, they will be in safety in the sense of collisions with objects and other people. An application can be completed with monitoring of physical activity. It is possible to monitor movements for smaller spaces with such sensors as Kinect. And one can walk around the virtual space displayed in HMD in Virtusphere. If one plays sitting in an armchair or standing in one place it is possible to control avatar movement with touchscreen or manipulators instead of physical movement. One or several users can chase the sound beacon in the virtual space for stimulating movements at the stadium. A "flying" MP3 player can be the beacon. It means that it is possible to play the music the user would like to listen to. The user will pass or run unnoticed a fairly large distance and take the necessary exercise controlled by applications trying to get closer to the moving player. Data of physical activity from portable monitors allows fine adjusting of it both from smartphones and specialized watches and wristlets.

A method for orientation by sound beacon in the virtual and real spaces This method can be useful under conditions of low visibility, in fog, at night and can become the only possible one for blind people and people with limited vision ability. The variant of the described method of orientation by sound beacon could be a method of orientation of the blind user by the sound beacon created in the virtual space.

A method for orientation by the sound beacon is that the user is provided with stereo headphones, the target for orientation and coordinates of the target are determined, location and orientation of the user in the space and direction from the user to the target are defined, in the direction of the appropriate target is installed a sound beacon in the appropriate virtual space, sound signals to the user's headphones are calculated and transmitted in such a way that the user will be able to turn toward the signal of the sound beacon while perceiving where it comes from. Additionally it is possible to provide the user with an approving signal when the user has correctly oriented himself to the set target. In addition, a tip is complemented with speech commands about the side it is better to turn to because it is closer to the set target and with comments to actions. It is preferably to control by hardware if headphones are connected to recommend the user to put them on.

It is useful even in the displayed virtual space for sighted people to mask game objects on some levels, the user will have the possibility to play blindly, to practice in orientation only by aurally. For example, after shooting you can show the object which the user has shot on for a while in order he can correct the aiming in the future. It can be natural as by shooting at night and the lighting for a minute is of the flash by shooting.

Examples of Applications According to the Invention:

Orientation to Qibla in Mecca for praying Muslims An application and device for orientation determining, e.g. Qibla (Caaba in Mecca) even for those who are blind in both eyes. This application can be useful and used in many cases when it is necessary to orient correctly but there is no visual cues or there is no possibility to see them.

The task of Qibla determining was the one of the most important tasks adopted to the science by the Islamic religion. Since the case was in the obligatory ritual of fivefold daily prayers, the breath of life becomes the skill to identify necessary direction in any geographic point. Often it used to cause difficulties for e.g for travelers who found themselves in a desert without any landmarks. The more precise definition of Qibla becomes one of the key reasons for development of geography, mathematics, astronomy and other sciences in the Islamic world. In the modern calculations direction of Qibla is determined from the shortest distance on the earth's surface. GPS and a navigator deals with this task easily. An additional task for a blind man is to orient to Qibla on his own without the possibility to look at the screen or reading of instruments and a compass.

With respect to the invention the method is that the user, e.g with a smartphone and headphones, runs an application which determines his location according to the data of GPS, defines orientation to Qibla in relation to his location, then it sets the sound source (sound beacon) in the direction of Qibla and gives a signal. The user will hear the signal in his headphones and turn to its side, to the necessary side in order to be able to pray correctly. This method would allow even a blind or visually impaired man to orient to Mecca and it ensures that he will have the possibility to pray correctly being unable to see the compass needle or other visual references on the screen. If there is no GPS in the gadget, coordinates can be entered by hand or by voice. It would be useful to have a menu with option of choosing the point of your location or simply option of a locality and country and in such way also coordinates of the orientation target. It will be profitable to make additional control if headphones are put on correctly. For this purpose you should, e.g. send an example signal first to the right ear, confirm verbally and by clicking the button that the signal is heard in the right ear. Then you should do it for the left ear and confirm that the signal is transmitted correctly. If one of the channels does not work it will have no effect of three-dimensional sound.

The user should be provided with oral and writing recommendations how to hold a smartphone as it will rotate in the space in axial alignment with the user in case when an orientation sensor or digital compass is not installed on the user's head but gadget sensors are used. Then its orientation (if there are orientation sensors) could be taken for orientation of the user. If orientation sensors are located directly on the user's head gadget orientation will loose its value. An orientation sensor can be fixed on the user's head in different ways. This can be a virtual helmet (glasses) of a type with orientation sensor. This can be glasses or headphones supplemented with orientation sensor. In all described cases a digital compass, three-axis magnetometer with three-axis accelerometer can be used while it is a less preferred option. But the variant of headphones with a digital compass may be the most effective as to the price and satisfy its objective.

Universally applicable devices kind of smartphones are easy-to-use, cheep and spread almost everywhere. But in the case when they are not enough, e.g. by those devices that have a limited number of the necessary sensors, additional devices or separate devices for execution on tasks can be used. In this case data from sensors of the external devices is combined and the smartphone serves as a computing device and sends calculated sound signals to the user's ears or a dedicated device can be used. An example of the minimalistic dedicated device: a complete orientation sensor with gyroscops or a digital compass (it is better to fix this sensor or maybe the whole device on head), processor, GPS, stereo headphones, push button and/or sound interface would allow completing the set task or many others. Another way of the method application is the possibility to play in the virtual space with orientation by sound. For example, there is a possibility to hear the target and orient on it, to hear the target hit or miss, moving to its side, get points number, instructions. Additionally instructions and service information can be represented not with three-dimensional but a common sound.

Another variant of implementation may be smartphone vibration by rotation towards the necessary side. This minimalistic variant can be used by those who are hearing-impaired in one ear. Rotation of the user towards the side of a common sound beacon can be complemented with gadget vibration or verbal approval.

For implementation of invention it would be useful to produce headphones compatible with an orientation sensor or digital compass. It is profitable that such headphones have a device prompting the user how to put on headphones correctly in order the signal for the right ear comes to the right headphone and signal for the left ear comes to the left one. It is useful to fix an orientation sensor or digital compass on glasses frame or on glasses themselves, on a cap and headphones should be connected to them in such manner that the user will be able to put on them definitely correct way. Headphones with a temple can have orientation sensor on the temple, in-ear headphones can have orientation sensor on one of the ears or on the connection of two wires on the chin that is more common. Moreover a small sharp pin on the connection place where the sensor is fixed would not hinder the user if putting on properly. And if the right side is mixed up with the left one this pin would be directed to the breast and cause inconvenience. Orientation sensor is to be fixed on wires before its connection to form a sort of a triangle.

Other ways of application of the described invention: a compass with sound signal beacon and interface; supplement of a common navigator with navigation function and interface in order a blind man will be able to orient in the space with auditory cues and complemented verbal prompts used in common navigators for sighted people; orientation of geliostations, solar panels with determining of GPS coordinates, time of day and year for automatic and highly effective orientation to the sun. Solar panels become very popular in houses, cars, soon they will be small and mobile for individual use and orientation to the sun, e.g. with servo drives powered by the accumulator connected to the panel or directly from the panels will be logical. Processor can calculate a highly-effective direction for panels and control their orientation and even turn them around after the sunset to the east side to prepare them for the morning. Development of skills to orient by the shot sound would be useful for military, policemen and other law enforcement forces. Such application would be also useful for hunters to train skills of recognition of different animals by sound and knowledge to determine which side the sound come from. A rustle of a squirrel moving through the withered leaves differs greatly from ground-squirrel and deers.

Computer games where three-dimensional sound would be not simply a small feature but one of the most important one to increase the variety of interesting applications. In such applications orientation by three-dimensional sound will offer users an advantage and become one of the main game interfaces. Sound applications where it is necessary to avoid the sound source, run away from it or follow it. For example, let's imagine three classes of objects each of those can feature own sounds, it is necessary to run away from some of them, to come closer to another ones and the third sounds are neutral (e.g., informative, they can not be in 3D). Additionally physical activity can be taken into account.

In games with three-dimensional sound it is preferentially to have sounding subjects in game in order the user will be able to orient according to their sound. As a preferred option can be the following objects: continuously murmuring bees, wasps, bumblebees, flies, gad-flies; chirping gnats and mosquitoes; animated 3D players; singing objects.

A method of providing to user a three-dimensional music A variant for predefined position in the space sources of the sound of music composition (artists, singers and/or musical instruments).

The method means the sound recording with stereo microphones in such way that the user will be able to feel sounds arrangement in the space and their moving in time towards the user (listener).

The user will have a feeling of involvement, of presence near his cult figure and artist. Subsequently a feeling will occur that the song is for him. Usually the artist is detached from listeners with a scene. Usually there are thousands of listeners in the concert hall. There are positives points in it. The multitude are getting worked up, wind up each other, general euphoria of performance raises up. In all cases there are fans and overemotional people in the hall by which the artist trigger emotions quicker. Other concert-goers often are given these emotions and worked up from it. The artist contacts with the audience, with the multitude and only partially with individual listener. Listening in the hall is both an advantage and disadvantage. For example, in specific situations artists can allow themselves to sing to a backing track. For example, even if the artist is moving through the scene, the singer is singing using a microphone which he takes with him and it is not reflected on the playing back from stationary located sound speakers in the hall. The microphone of the artist can be mono or stereo but his moving through the scene, e.g. from the right to the left does not change the volume from the speakers in the right and in the left parts of the hall. It is unnatural in the nature but became usual on concerts.

Stereo on basis of 3D sound could ensure the effect of the sound presence (by analogy to the telepresence). For this purpose a stereo microphone should differ from the common stereo microphones. First of all microphones should be mutually spaced and specially directed to the user's ears. In the simplest case we talk about two microphones for the sound recording for the right and for the left ears. But their number can be greater. According to our invention stereo microphones should be mutually spaced correctly. An optimal distance is an average distance between the human ears. The distance between ears is different by different people and the average distance vary from 14 to 16 cm.

In some cases for enhancement of the effect of the sound dimensionality it is profitable to make the distance between microphones greater than the average distance between ears of the average man.

A muffling device should be set between microphones, it should have similar properties as by muffling the sounds with head, like a head shadows sounds from the ear which arrive from the other side, like a sound rounds the head and comes to the ear from the side shaded from the sound source (head-related transfer function). Depending on the way the sound arrives to one of the ears a braincase can partially with attenuation come to another ear. It depends on the way the sound arrives to the user. For example, the real sound without headphones, headphones dynamics of which are associated with the ear size and can shake a little bones of a braincase, in-ear headphones put in the auditory canal of the ear, or contact speaker system which shakes a bone. Such phenomena like attenuation, diffraction, interference etc. for sounds of different frequency can occur in different ways depending on material, shape, capacity of a screening microphone. It is useful to select such properties as it maximally matches what happens with human head. Then the recorded sound will reproduce in more exact and natural way movements of the user in relation to the future virtual listener and influence him stronger and more natural triggering emotions.

Often the part of the sound is transmitted to the shaded ear via human braincase while he does not realize it. It is known a method for providing the user with sounds by means of a contact method when speakers do not give rise to oscillations of the air but by means of a contact through the skin with ossicles, they transfer oscillations to sensitive mini ossicles that if the sound shakes drum membranes through the air will also oscillate from these membranes. These ossicles through neural sensors in brain are perceived as a sound. Such speakers can also be used for reproduction of dimensional sound to the user. Additionally this method of the sound transmitting through the bone indicates that sound vibrations on one side of the braincase can with attenuation partially arrive to the sensitive elements of the other ear.

To have full image we need to keep in mind that external ears of a human plays an important role. They, e.g. can reinforce the sound on some frequencies by concentrating the sound into the ear. They reinforce sounds that come from the front side of the user's head. Account and creation of such surround for microphones will increase credibility of 3D sound and naturalness of perception of the record for the user.

Microphones on gadgets are generally mono type. Even in standard four-pin audio jacks two channels and a ground are aimed for headphones and only one channel and a ground is intended for a mono microphone. More often inbuilt microphones are not mutually spaced so that it has the same properties as reception of three-dimensional sound by the user's ear. The average size of smartphones matches the average distance between ears of the man and consequently it is possible to build stereo microphones correctly into such smartphones according to the invention. This possibility is even higher for tablets, as they are big enough to install microphones on one edge at the necessary distance. Stereo sound recorded with such microphones will be more preferred by filming a video or panoramic video. You can always change recording option on the smartphone from mono to stereo and vice versa.

This method will be profitable in cases when it is necessary to create the effect of presence, stress intimacy of the events. Difference between a concert band in the hall or a singer on the big scene and a musician and singers in one room nearby. For such different cases even different music s composed. For example, works composed for a chamber orchestra differ a little from works composed for reproduction in concert halls. This method for creation and reproduction of 3D sounds is similar to salon reproduction like it was made music and sung in houses before invention of radio. 3D sound will be necessary for immersive virtual reality complemented and combined reality, telepresence, by recording panorama 360 and immersive movie.

For immersive movie it is profitable to complement a previously shot panoramic video with the sound re-computed as 3D sound depending on the user orientation when there is a possibility to space the sound sources mutually in the virtual space. By shooting an immersive video by 360 degrees according to the invention it is profitable to record the sound with stereo microphones for each recording video camera. Then by video playback those channels of the sound reproduction would be switched on, these channels conform to the direction on the picture which the user is looking at. Usually for shooting of an immersive panoramic video minimum two cameras are needed and up to dozens of them depending on the required quality. The same quantity of stereo microphones we would recommend for use. For more exact reproduction of the sound in a panoramic video it is profitable to record the sound sources separately when it is possible and place them in the virtual space of the panoramic video in the correct accordance. Then by head rotation towards a certain side the user-concert-goer-listener will hear the correct sound from the correct side from the sound sources. It is possible to recognize images of the sound source where a newsreel shooting was performed without the possibility of recording through the separate channels, separate them and use the positioned sound sources in the virtual space in the right places. Even now there are instruments for shooting of the ambient video and building of 3D model in the real time mode that could be used by providing the user with these models of the virtual space. It was proposed no decisions for recognition and positioning of the sound for such space. Another variant of implementation of the dimensional sound for panoramic (dimensional) video is that by shooting of the visual imagery with many cameras the sound of artists (or other sound sources—guitars etc.) is recorded with a portable microphone and in the same time the user (microphones) coordinates in the space (towards a camera) are recorded. If cameras are moving it is profitable to record both camera coordinates and the sound sources. The coordinates of actor with microphones can be determined after shooting or in the real time mode by means of recognition of images of the shooting video. By reproduction of the panorama video to the user in the virtual helmet the sound is played back with a sound engine according to the recorded coordinates of the microphone during recording in relation to the camera and now in relation to the viewer-listener. In this case the user will see dimensional movie all around and truly three-dimensional sound from artists or other sound sources.

Further immersion could go on in the sort of the virtual reality when the user could move in this model though the shooting was performed from one point even if it was panoramic. The sound sources could be positioned automatically and then by moving in the model of this space the user would hear dimensional sound. I.e. we could move to any side of the video from the virtual point of the performed shootings like zoom in putting us closer to the shooting object. By recognition and positioning of the sound sources in the space it could be possible to change the sounds volume by coming closer to them and for sure balance between channels depending on orientation of the user's head to the virtual sound source.

According to the invention for implementation of invention it is profitable to create and use stereo microphones that are correspondent to the above-described properties: mutually spaced microphones (generally at the average distance between human ears) oriented to different sides with a screen buffer between them in the sort of human head. Some parameters of such device could be adjustable: distance between microphones, microphones directivity, size, shape and screen material between them, a sort of radars that concentrates the sound the same way as human ears. The sound recording should be performed by active moving of the user in front of and around the microphones as if the user sings or talk for a certain man. Then it will seem to every user (or listener-viewer if the soundtrack is assisted by the video record or panoramic video) that the artist is singing specially for him, it will provide him with the effect of presence and intimacy of presenting. Such records could be mixed with additional sounds including animated movements. With stereo microphones of this type not only music recording studios, 3D cameras and panoramic cameras could be fitted but also such widely spread consumer devices like smartphones, tablets and similar gadgets. A need in correct recording of three-dimensional sound will increase with increasing of number of applications with virtual reality, augmented reality and other applications with three-dimensional sound. Such three-dimensional music and songs can create a new genre of presentation-address for one man. Such method of sound recording (and video) could also find a use for erotic applications elevating a feeling of involvement in the events.

Such type of approach to perception of three-dimensional sound could be also useful in robot industry. It will enable robots to orient not only based on the recognition of the visual images but also recognition of ambient sounds and its location in the space. For example, automatic orientation of cars on the road using GPS and recognition of visual images is necessary to complete with reaction on sounds (such as alarms of surrounding cars, whistle of a policeman etc.). It would increase safety of autonomous transport means the quantity of which should dramatically increase in the near future. For this purpose it is useful to build into such cars at least stereo microphones and ideally also microphone clusters which signals allow to recognize a sound signal type, its location even if the source is not on the line of sight.

We cite an example of the method of a music piece or song record with stereo microphones. According to the invention the stereo microphone will keep a record in the course of moving and stopping of the artist (or artists) around it, it will allow the user-listener to position the artist and his movements around it listening to the record, it also will create a feeling of his presence nearby as if the artist would perform his music piece specially for him. It arises the effect of performance intimacy. The user will be able to feel approaching of the artist and his removal, moving from one side to another one and even that what the artist sings under his breath in one of the ears. It was impossible by performance of the artist on the far removed scene, only by close contact. «Close contact» is virtual in the sense that music and/or a song can be recorded in a studio at the distance of thousands kilometers. But it will be perceived that as the artist is nearby then and there. Such performing should have more affect on the user (maybe deeper on the subconscious level), it will give additional possibilities for more clear and effective advertising, politicians speech, tuition. Pre-recorded sound channels, tracks can be turned into animated three-dimensional sound with the aim of applications with virtual reality. If the artist (microphone) coordinates are recorded during the presentation, it would be possible to position the sound source according to the recorded coordinates by reproduction in the virtual space.

A method for use and interactive providing of multichannel sound to the user A variant for the recorded music piece which was not pre-determined in the space. A method for use and interactive presentation of multichannel music piece to the user.

In this invention a method for use of the sound signals for interactive listening by the user is described. The method allows dimensionally representing of the sound source in the virtual space with possibility of the user to move in this space for interactive reproduction of these sources as of interactive three-dimensional sound. It is possible to change settings of the sound sources in the space as well as animated space. The user in stereo headphones will have the possibility to distinguish the location of the sources in the space by means of binaural hearing with possibility to change his orientation and position towards these sound sources. With binaural hearing man is able to determine where the sound source is not only in azimuth but also estimate that it comes from above or from below. It is enough for the user to incline the head to the right or to the left and he will be able to understand exactly the height the sound sources is on even if the source is invisible.

For historical reasons sounds including music and songs (soundtracks) are recorded with microphones from stationary points in relation to the artists. Even if several sound channels are recorded, e.g. several singers or separate musical instruments, all the channels are brought all together for reproduction by the user statically in two stereo channels for headphones or speakers, or at Dolby standard in more advanced case. The user has limited possibilities of interactivity such as volume change, sometimes balance change between channels or change of frequency background and tone on advanced devices. He cannot turn off any of the sources on his own free choice, change the volume separately for one of the sound sources because all these sound channels are already converted to a statical work, e.g. on CD or in MP3 format. Although this work is made by talented and experienced sound producers and users can enjoy their variant of representation. But they cannot listen more attentive to a certain sound source at his own wish, e.g. to a singer or guitar when they would like to. Modern facilities of microprocessors and the stated method allow listening to the pre-recorded music in a new light if soundtracks of the separate not re-recorded (not mixed) music channels are saved in archives or new music by saving it in multichannel variant which is the perfect choice for the described method.

Absence of computers and sound engines for three-dimensional space in old times left its traces on the method of recording of music pieces. The sound even of the mutually spaced sources (channels) is recorded (re-recorded) even if it is performed by professional sound producers in two stereo channels for the user. A more positive variant, Dolby record and reproduction is more progressive but has the same disadvantages, previously pre-recorded sound without the possibility of interactive interaction with separate sources. A minimal possibility that the user has is to change the sound volume of the whole work or separate speakers but not initially recorded channels of the sound sources. Even on expensive high-end equipment the user can reinforce the sound of a certain frequency with equalizers, change the volume for stereo or Dolby channels but not of the initial sound sources. The user has no possibility to come closer to the sound source to enjoy its nuances nearby, turn towards it the way he would like. But these are limited possibilities of reception of the previously pre-recorded (mixed) sound sources that can not give the effect given by the provided in the invention method.

In the recording studios soundtracks archives of works with not pre-recorded sound, not pre-recorded channels are held. A new method of use of such recordings is proposed in the invention that will allow the users to enjoy music and songs with new interactive possibilities providing an opportunity to feel particular nuances of each sound sources having the possibility to listen to the same work thousands of time in different ways. They can give attention to those sources they give preference to. This method will allow the holder of rights of these recordings to get additional income opening new commercial possibilities of use of these archives. Of course recording of new works according to this invention will allow using of music pieces more varied commercially, specially because of interactive possibilities for billions of user gadgets such as smartphones, tablets, glasses for virtual reality and other portable devices. According to the invention the use of multichannel sound for interactive applications with 3D sound will allow to create more individual, intimate and interactive music compositions. In these works-applications the user can come up with the artist or between the artists and musicians or become a central «place» for which this work is composed and in some cases even to be its participant.

It will allow the user to become a music creator to some extent (or music variants), be a sound producer or editor of this music. The user would be able to position the sound sources including animated ones for moving them in the space in a predetermined or random way for a period of time the way he likes. The user would have the possibility of more advanced original KARAOKE. He could reproduce it by himself having decreased the volume and removed the vocal channel as well as recording it for further playback by other users. Additional novelty is that it will be possible to perform substitution in the original karaoke via any channel (sound source) or via several ones. For example, if you are a bass guitar player and are fond of percussion instruments you will have the possibility to play a part of your favorite music piece on your guitar "together" with a great artist. He will be able to listen to the music piece where he has played a part. It can be a basis for a new type of interactive games kind of "Rock Band" but with real listener participation in music. There will be applications with greater possibilities and interactivity. It is impossible to do it with previously pre-recorded music where channels are combined and mixed and brought together into stereo channels or Dolby.

According to the invention the method is that each recorded channel (sound source) is set in the virtual space with its coordinates. In the simplest case it can be dotty sound sources with the sound propagation evenly around and above. In some cases orientation of the sources in the space will also be important with its function of power distribution in the space depending on orientation. For example, sound shading with the artist's head can be taken into account. Line and orientation coordinates in the application can be fixed or changed according to the scenario and/or at random or under the control of the user. Coordinates of the user in this virtual space can also be changed. A sound engine ensures at least the main properties of 3D sound, sound attenuation by the sound source removing from the listener and different calculating sound volume for the left and right ears depending on the distance to the sound source and head orientation towards the line connecting the user and the sound source. These sound properties are well known and are simply simulated for the virtual space. To the sound engine all real properties of the sound can be included or added unreal ones. There are some of additional well known properties: diffraction, interference, time difference of the sound arrival to the right and left ears, account of sounds shading by head or other obstacles, changing of reception properties depending on the sound frequency (spectral characteristics) as well as combined with the above listed properties. The user can position location of the sound source towards himself by the sound reception. For example, a singer or singers will be mutually spaced in the virtual space as guitar players, percussionist or other participants of a vocal-instrumental ensemble. The sound engine will change the sound volume of each sources depending on the distance to and on the user orientation towards each source. The user in stereo headphones will hear sounds and his brain will calculate (its neural networks will give definitely enough an indication) where the sources are even if the user does not see them. It will give the user a possibility to move towards the sound sources the way he wants and determine their location by sound. For example, when a vocal part begins it is possible to come closer to the vocalist and when, e.g. plays a bass guitar to come closer to the bass guitar player insofar as it will be comfortable for him. In some applications this possibility will allow the user to preset the sound sources the way he wants and move them during the presentation. The user-listener acts there as kind of a bandmaster, stage director, sound producer on which actions the sound volume and accents will depend. By describing such interactive three-dimensional sound for the user's applications in details we notice that these applications can be combined with reproduction of visual imagery in the form of virtual reality, complemented reality, or in separate cases by the panoramic or simple video. These interactive applications can be used only for sound though the engine for sound calculations will use coordinates in the virtual space from the sound source to the user's ears immersed in this virtual space. It is profitable to complement such application with visual imagery with display of instruments and artists. Animation of artists and use of visual effects will show to advantage. Photos and videos implemented in the application of virtual reality could be a part of such applications. It is useful to complement such application with a virtual guide with comments where his video display and/or sound could be turn off as you wish. This guide could provide the user with the song translation into his native language. The translation could be turned off also as a three-dimensional pony-teletext in the artist's or listener's native language. Game moments could consist in following the animated artist, approaching to instruments or the vocalist in the necessary moment when his part begins. An expert or fan would get more points because they know the music piece and can expect what comes next. An interesting task for fans would be to locate the sound sources in such way that the result of playback would match with the known variant on a record or CD. It could also be estimated in points. Such music playback in the virtual space could be accompanied by unrelated game elements connected, e.g. with physical exercises or which are taken from other game.

The user by listening and interaction with an application based on the multichannel three-dimensional sound will search a route and points to fully enjoy the playback. The user could share his recorded routes for a certain music piece in order his relatives will be able to feel it deeply as he did. The avatar of the user can be displayed in the application. Then he and his partner connected to the same space (also displayed for the other one) would be implicated in one virtual space. It would be a shared listening. They could discuss the events together and intercommunicate. This variant would be the most applicable in social networks. A game with the multichannel three-dimensional sound where the user is looking for a good point for sounding. In fact it can be a 3D sound. As during the song the best point for listening can be changed.

Interfaces for Application with Dimensional Sound

Interface variants for interactive communication with the sound sources in the virtual space:

Interface for such listening can be quite diverse from providing with the possibility of physical movement in the real space in a virtual helmet with headphones (or without virtual helmet but with headphones) if the user's movement is monitored with sensors, e.g. by means of microsoft Kinect or physical walking in the Virtusphere. In such case his movements will change his position in the virtual space allowing to approach to or move away from the sound sources or change his orientation towards them. By using a smartphone it is possible, e.g. to walk physically if the smartphone or additional sensors will monitor his movements. A more commonly used variant with gadgets where the user will move in the virtual space like in computer games with various interfaces. Please see the most common of them below. Using of a virtual helmet with orientation sensor and headphones. Simply using a smartphone with headphones and using orientation sensor to control rotations of his body in the application in alignment with the smartphone and make movements, e.g. with touchscreen or gamepad. Using a smartphone with headphones without turning round with the smartphone (if it has not orientation sensor) for orientation but use touchscreen or gamepad for rotations and movements. The last variant is suitable if the user, e.g. sits in an arm-chair in a plane or bus and do not have the possibility to turn on his axis for orientation in the virtual space like he orients in the real space. By rotating in the virtual space (by rotating his avatar) the user practically reverse the virtual space. Having heard the sound source, e.g. at the angle of 40 degrees to the left the user with a little experience will turn the space to the right in such way that the sound source will be opposite to him in the middle of the screen. And if, e.g. this sound source is an enemy object he will be able to shoot it. Or come closer and shoot it. Or turn the weapon to its direction and shoot. Or move (run away) to the safe side. Such usage of three-dimensional sound in applications will help the game player a lot and become the main game moment.

Such interactive immersion into three-dimensional sound with or without display of the virtual space should have deep and clear affect on the user (possibly more deeply on the subconscious level) and it will give additional high possibilities for advertising and tuition. Such interactive immersion into the space with sources of three-dimensional sound would allows even blind or visually impaired people to play three-dimensional games because it provides the possibility to orient in the space by sounds and communicate with them interactively.

A sound source can be not only dotty like it is usually implemented in sound engines but also extended one (e.g., string of a guitar or piano). It will allow to have a dimensional, rich and natural sound even from one source if it is provided correctly.

It is possible to complement the sound in the hall with virtual sources in order to provide the user with a feeling of involvement with other virtual listener, e.g. with applause of other listeners, approving outcry mutually spaced all round. It can be a variant the user can choose by listening a music piece (or interactive application, e.g. smartphone). For example, the well known song of the band Eagles "Hotel California", over the track that probably was recorded in a studio it have been also recorded the audience reaction to the song by performance in the concert hall. It provides the involvement in the listening in the hall though the user probably listens to the track individually in his car, at home from speakers or through headphones.

Closer is only variety of chamber music and salon performance of music or music pieces when the singer was in close proximity to the listener.

In such cases when the use of headphones is impossible or inconvenient it is possible to provide an immersive three-dimensional sound without headphones in the limited space. For this purpose minimum four sound speakers are installed around the perimeter. Maybe optimum will be six or eight devices for reproduction of sounds (sound speakers). In this case it is important to know the way the user is oriented. The space with speakers will always have the same orientation as the virtual space has. The user coordinates could be changed in VR with controller and/or device kind of Kinect which monitors real movements of the user but in the limited space. The sound from the source sound in the virtual space will be reproduced on sound speakers according to the user position in the virtual space. The sound engine in the application will calculate orientation and position of the sound sources in the virtual space towards the user and a signal will be given on the speakers that will be interpreted by the user as a three-dimensional sound. For this purpose it is necessary to use an additional driver and device for sound distribution through the speakers. Speakers arrangement in the space and their quantity should be entered to such driver as parameters. For example, if the sound in VR goes from the North, in real space the sound goes from the North. If the sound goes from the North-West, the sound should be reproduced from the North and West speakers with condition that there are 4 speakers and they are installed in the cardinal directions. Cost effective for such applications with three-dimensional sound is to use stereo headphones or virtual glasses with stereo headphones.

The most of the above-described applications with three-dimensional sound and their interfaces could be successfully complemented with sound control by the user's voice. It is helpful when the application has control by means of voice commands recognition. BANG! BANG!—shooting. The user that holds a smartphone in front of him, or if it is worn on head, or with headphones with microphone could shoot by means of voice, move and even turn round.

We claim:

1. A method of interactively providing, to a user in a virtual space, a musical composition made up of recordings from a plurality of respective sound sources, the method comprising:

determining, by a processor, coordinates of each of the plurality of sound sources in a virtual space, wherein at least two of the plurality of sound sources are disposed at different locations in the virtual space and represent different musical instruments or vocal sources;

determining, by the processor, an initial position and orientation of the user in the virtual space relative to the plurality of sound sources;

activating, by the processors, a playback of the musical composition via the plurality of sound sources;

changing, by the processor in response to user input, the position and orientation of the user in the virtual space relative to the plurality of audio sources during the playback of the musical composition, including:

calculating sound volume for each of the user's ears by applying a Head-Related Transfer Function (HRTF), and providing sound from each of the plurality of sound sources to each of the user's ears according to the current position and orientation of the user in the virtual space relative to each of the plurality of sound sources, in real time.

2. The method according to claim 1, including determining the orientation of the user in the virtual space in accordance with an orientation of the user in a physical space.

3. The method according to claim 1, including determining the position and orientation of the user in the virtual space in accordance with an orientation and a position in physical space.

4. The method according to claim 1, wherein changing the position and orientation of the user in the virtual space is in response to input via an interface including at least one of a touch screen, a joystick, a mouse, or a position and orientation sensor.

5. The method according to claim 1, further comprising changing the position and/or orientation of one of the plurality of sound sources in the virtual space in accordance with user input.

6. The method according to claim 1, further comprising adding a sound supplied by the user to the music composition in the virtual space.

7. The method according to claim 1, including determining the orientation of the user in the virtual space according to an orientation of a gadget located on the user's body.

8. The method according to claim 7, including using a smart phone with headphones as the gadget.

9. The method of claim 1, wherein the virtual space is associated with augmented reality.

10. The method of claim 1, wherein the virtual space is associated with virtual reality.

\* \* \* \* \*